US005773744A

United States Patent [19]

Nagata

[11] Patent Number: 5,773,744

[45] Date of Patent: Jun. 30, 1998

[54] KARAOKE APPARATUS SWITCHING VOCAL PART AND HARMONY PART IN DUET PLAY

[75] Inventor: Yuichi Nagata, Hamamatsu, Japan

[73] Assignee: Yamaha Corporation, Hamamatsu, Japan

[21] Appl. No.: 722,361

[22] Filed: Sep. 27, 1996

[30] Foreign Application Priority Data

Sep. 29, 1995 [JP] Japan .................................... 7-253494

[51] Int. Cl.[6] ............................. G09B 5/00; G10H 1/10; G10H 1/36

[52] U.S. Cl. ................................ 84/610; 84/625; 84/631; 84/DIG. 4; 434/307 A

[58] Field of Search ............................ 84/609–614, 625, 84/631, 634–638, DIG. 4; 434/307 A

[56] References Cited

U.S. PATENT DOCUMENTS 5,235,124 8/1993 Okamura et al. ..................... 84/631 X
5,243,123 9/1993 Chaya .................................. 84/625 X
5,286,907 2/1994 Okamura et al. ..................... 84/610 X

*Primary Examiner*—Stanley J. Witkowski
*Attorney, Agent, or Firm*—Pillsbury Madison & Sutro LLP

[57] ABSTRACT

A karaoke apparatus mixes a live singing sound with a harmony chorus sound and an orchestral accompaniment sound. A first input terminal is connectable to a microphone to receive therefrom a first vocal signal representative of a first live singing sound. A second input terminal is connectable to another microphone to receive therefrom a second vocal signal representative of a second live singing sound which is different than the first live singing sound. A chorus generator is provided for processing the first vocal signal to generate a harmony signal representative of the harmony chorus sound which originates from the first live singing sound. A mixer is provided for mixing the generated harmony signal with the second vocal signal, which is not processed by the chorus generator, to provide a mix signal. An output device includes a loudspeaker for amplifying the mix signal to acoustically produce the harmony chorus sound originating from the first live singing sound concurrently with the second live singing sound along with the orchestral accompaniment sound.

7 Claims, 3 Drawing Sheets

KARAOKE APPARATUS SWITCHING VOCAL PART AND HARMONY PART IN DUET PLAY

BACKGROUND OF THE INVENTION

The present invention relates to a karaoke apparatus capable of generating a harmony chorus sound harmonizing with a karaoke singing sound in order to create a harmonizing effect.

In the prior art, there is a known karaoke apparatus in which a live singing sound is picked up by a microphone, mixed with an orchestral accompaniment sound, and acoustically reproduced through a loudspeaker.

There is a new karaoke apparatus (not the prior art) equipped with a harmonizing facility, in which a harmony chorus sound harmonizing with the karaoke live singing sound is generated to create the harmonizing effect. The applicant has already proposed such a new karaoke apparatus in Japanese Patent Application No. 7-16181. In this patent application, the harmonizing facility is achieved by shifting a pitch of the live singing sound to generate the harmony chorus sound harmonizing with the live singing sound. The generated harmony chorus sound is mixed with the live singing sound.

A recent karaoke apparatus is normally equipped with two or more microphone input terminals to allow a multiple of singers to sing simultaneously before microphones. However, in the new karaoke apparatus having the harmonizing facility, the chorus harmony sound is generated with respect to the mixture of vocal signals picked up by the plural microphones. The vocal signals picked up by the microphones cannot be treated separately from one another, since most of the karaoke apparatuses have a single harmonizer circuit in view of reduction in the cost of the system. Thus, even if the new karaoke apparatus is equipped with multiple microphones, the generated chorus harmony sound is eventually monotonous, and lacks some fun in duet singing play or else.

SUMMARY OF THE INVENTION

The purpose of the present invention is to provide a karaoke apparatus capable of generating a pleasant harmony chorus sound even in situations where a multiple of singers sing together before multiple microphones.

According to the invention, a karaoke apparatus for mixing a live singing sound with a harmony chorus sound and an orchestral accompaniment sound comprises a first input terminal connectable to a microphone to receive therefrom a first vocal signal representative of a first live singing sound, a second input terminal connectable to another microphone to receive therefrom a second vocal signal representative of a second live singing sound which is different than the first live singing sound, a chorus generator for processing one of the first vocal signal and the second vocal signal to generate a harmony signal representative of the harmony chorus sound which originates from the one of the first live singing sound and the second live singing sound, a mixer for mixing the generated harmony signal with the other of the first vocal signal and the second vocal signal, which is not processed by the chorus generator, to provide a mix signal, and an output device for amplifying the mix signal to acoustically produce the harmony chorus sound originating from the one of the first live singing sound and the second live singing sound concurrently with the other of the first live singing sound and the second live singing sound along with the orchestral accompaniment sound.

In a specific form, the inventive karaoke apparatus further comprises a selector switchable between a first state where the first vocal signal is selected to be processed by the chorus generator while the second vocal signal is passed to the mixer, and a second state where the second vocal signal is selected to be processed by the chorus generator while the first vocal signal is passed to the mixer. Further, the selector is switchable to a third state where both of the first vocal signal and the second vocal signal are selected to be processed by the chorus generator so that the harmony chorus sound originating from both of the first live singing sound and the second live singing sound is mixed to both of the first live singing sound and the second live singing sound.

DETAILED DESCRIPTION OF THE INVENTION

Figure 1:
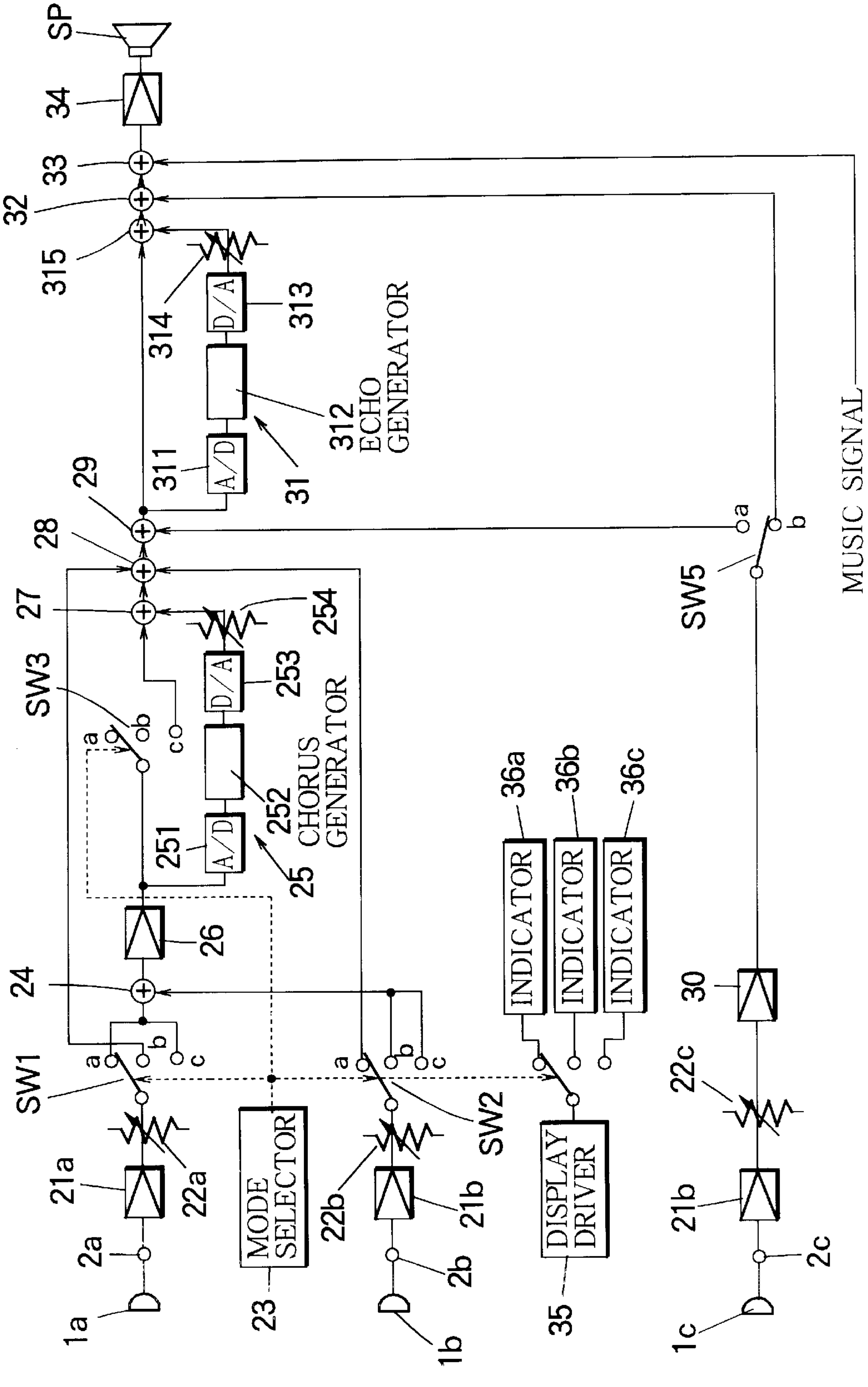
FIG. 1 is a schematic block diagram showing an embodiment of a karaoke apparatus according to the present invention.

FIG. 1 is a schematic block diagram illustrating an embodiment of the karaoke apparatus according to the present invention. In FIG. 1, numerals 1*a* to 1*c* denote a plurality of microphones to pick up live singing sounds of karaoke singers, and convert them into electric vocal signals. The first and second microphones 1*a* and 1*b* are used by karaoke singers in duct play or else and are connected to respective microphone input terminals 2*a* and 2*b*, while the third microphone 1*c* is used for either of singing play and announcement, and is connected to a corresponding microphone input terminal 2*c*. The output vocal signals of the microphones 1*a* to 1*c* are amplified by respective amplifiers 21*a* to 21*c*, and the level of the amplified vocal signals are adjusted by attenuators 22*a*, 22*b* and 22*c*, respectively.

A mode selector 23 switches an operating mode by controlling three-contact interlocking switches SW1 to SW4 according to a user command inputted from a key controller (not shown). The karaoke apparatus 2 has three operation modes M1 to M3. All contacts "a" of the switches SW1 to SW4 are closed in the first mode M1, all contacts "b" of the switches SW1 to SW4 are closed in the second mode M2, and all contacts "c" of the switches SW1 to SW4 are closed in the third mode M3. All the switching operations of SW1 to SW4 are effected in interlocking manner.

Numeral 24 denotes a mixer to mix the vocal signals fed from the microphones. In the state of the first mode M1, the mixer 24 passes alone the first vocal signal fed from the contact "a" of the switch SW1 as it is. In the state of the second mode M2, the mixer 24 passes alone the second vocal signal fed from the contact "b" of the switch SW2 as it is. In the state of the third mode M3, the mixer 24 passes both of the first and second vocal signals fed from the contacts "c" of the switches SW1 and SW2.

A harmonizer 25 is comprised of an A/D (Analog/Digital) converter 251, a chorus generator 252, a D/A (Digital/Analog) converter 253, and an attenuator 254. In the harmonizer 25, the A/D converter 251 converts the vocal signal distributed through a preamplifier 26 from the mixer 24 into a digital vocal signal. Then, the chorus generator 252 shifts a pitch of the digital vocal signal to produce a harmony signal harmonizing with the original vocal signal. Then, the D/A converter 253 converts the digital harmony signal into an analog harmony signal. The generated harmony signal is attenuated by the attenuator 254, and is then fed to a mixer 27.

The mixer 27 mixes the harmony signal generated by the harmonizer 25 with both of the first and second vocal signals fed from the mixer 24 through the contact "c" of the switch SW3 in the mode M3. In the mode M1 or M2, the mixer 27 sends out alone the harmony signal from the harmonizer 25 as it is, since the switch SW3 is made open to contact with the open contact "a" or "b".

Mixers 28 and 29 mix the vocal signal inputted from the microphones with the harmony signal. The mixer 28 mixes the output of the mixer 27 with the second vocal signal fed from the contact "a" of the switch SW2 in the mode M1. In the mode M2, the mixer 28 mixes the output of the mixer 27 with the first vocal signal fed from the contact "b" of the switch SW1. The mixer 28 passes the output signal of the mixer 27 as it is in the mode M3.

When a contact "a" of a switch SW5 is closed, the mixer 29 mixes the output of the mixer 28 with the output of a preamplifier 30 which is connected to the third microphone 1*c*. When a contact "b" of the switch SW5 is closed, the mixer 29 sends out the output of the mixer 28 as it is. The two-contact switch SW5 is switched to the contact "a" when the third microphone 1*c* is used by one of the singers, and otherwise the switch SW5 is switched to the contact "b" when the third microphone 1*c* is used for announcement.

An echo effector 31 is comprised of an A/D converter 311, an echo generator 312, a D/A converter 313, an attenuator 314, and a mixer 315. In the echo effector 31, the A/D converter 311 converts the output of the mixer 29 into a digital signal, from which the echo generator 312 produces echo components. Then, the D/A converter 313 converts the echo components into an analog signal, whose level is then adjusted by the attenuator 314, and finally the echo signal is mixed with the original vocal signal outputted from the mixer 29.

A mixer 32 mixes the signal from the microphone 1*c* with those of the vocal signal, the harmony signal and the echo signal. When the contact "a" of the switch SW5 is closed, the mixer 32 passes the output of the echo effector 31 and the output of the mixer 29 as they are. If the contact "b" of the switch SW5 is closed, the mixer 32 mixes the output of the echo effector 31 and the output of the mixer 29 with the signal of the microphone 1*c* fed through the preamplifier 30.

A last or output mixer 33 mixes the microphone signals and the musical signal with each other. The mixer 33 integrates the sound-effected signal fed from the mixer 32 with the musical signal representative of an orchestral accompaniment sound including a guiding melody and an instrumental accompaniment. The music signal is provided from karaoke music data stored in a recording media such as LD (Laser Disc), CD (Compact Disc) and so on. The final audio signal is acoustically reproduced by an output device composed of a power amplifier 34 and a loudspeaker SP.

A display driver 35 controls indicators 36*a* to 36*c*. The display driver 35 drives the indicator 36*a* in the mode M1, drives the indicator 36*b* in the mode M2, and drives the indicator 36*c* in the mode M3. Therefore, the indicator 36*a* is turned on in the mode M1, the indicator 36*b* is turned on in the mode M2, and the indicator 36*c* is turned on in the mode M3.

Figure 2:
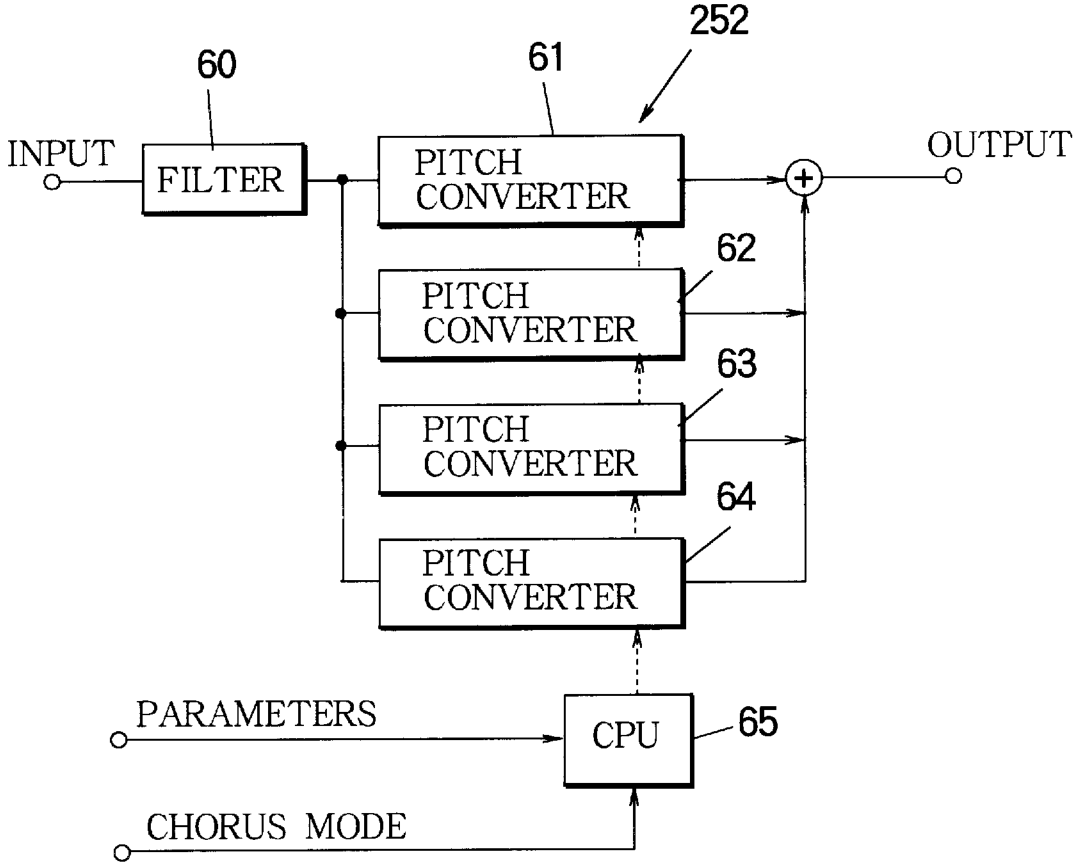
FIG. 2 is a schematic block diagram illustrating an example of a chorus generator provided in the embodiment of the karaoke apparatus according to the present invention.

Details of the chorus generator 252 will be described hereunder referring to FIG. 2. As shown in FIG. 2, the chorus generator 252 is comprised of a filter 60 and pitch converters 61 to 64. The filter 60 eliminates undesirable noise components from the original vocal signal. The pitch converters 61 to 64 transpose or shift the pitch (frequency) of the original vocal signal passed through the filter 60 by a predetermined degree in order to generate the harmony signal harmonizing well with the original vocal signal. In the present embodiment, it is possible to present various chords with generating four parts of the harmony chorus sound by the four pitch converters 61 to 64. The parameters to control the pitch shift degree can be stored in a ROM. A CPU 65 reads out the parameters from the ROM in order to distribute the same to the pitch converters 61 to 64. The parameters may be changed from a song to song according to MIDI (Musical Instrument Digital Interface) data, which can be distributed through a karaoke data communication network. The CPU 65 reads out the parameters depending on a chorus mode such as an upper harmony mode and a lower harmony mode, and distributes the parameters to the pitch converters 61 to 64. The chorus mode may be described in individual song data, or specified by the user through the key controller.

The operation of the karaoke apparatus will be described with respect to the modes M1 to M3. In the explanation below, the microphone 1*c* is used for the announcement or introduction purpose, and no singing sound is picked up by the third microphone 1*c*.

(1) Mode M1

If the user selects the first mode M1 through the key controller, all the switches SW1 to SW4 are switched to the respective contacts "a" with interlocked each other. Thus, the indicator 36*a* is turned on by the display driver 35. After a start command is inputted, both of duet singers A and B sing a main melody part in unison, respectively, before the microphones 1*a* and 1*b*. The first vocal signal picked up by the microphone 1*a* is fed to the harmonizer 25, where the pitch of the first vocal signal is shifted. Thus, the harmony signal harmonizing with the main melody sung by the singer A is generated. The harmony signal is fed to the mixer 27. The original vocal signal is not fed to the mixer 27 since the switch SW3 is made open. Only the generated harmony signal passes the mixer 27, and is then fed to the mixer 28.

The second vocal signal picked up by the microphone 1*b* is fed to the mixer 28 as it is. Accordingly, the mixer 28 mixes the harmony signal generated in harmonizing with the main melody sung by the singer A with the second vocal signal corresponding to the main melody sung by the singer B. The output of the mixer 28 is added with the echo components generated by the echo effector 31, and is then mixed with the musical signal in the mixer 32. The final signal is reproduced through the power amplifier 34 and the speaker SP.

Thus, in the first mode M1, if both of the singers A and B sing before the microphones 1*a* and 1*b*, the voice of the singer B is reproduced as it is as the main melody, while the voice of the singer A is converted into the chorus sound harmonizing with the main melody. Even if the singer A and B sing the main melody in unison without any consideration in harmony, it is possible to perform a chorus as if the singer B sings the main part and the singer A sings the harmony part. Further, the pitch converters 61 to 64 can generate a multiple of different chorus parts originating from the same voice of the singer A. Accordingly, it is possible to reproduce not only the duet sound, but also a rich chorus sound as if there are a lead vocal singer and a multiple of backing chorus singers.

(2) Mode M2

The operation in the mode M2 will be explained hereunder. If the user selects the second mode M2 by means of the key controller, all the switches SW1 to SW4 are switched to the respective contacts "b" with being interlocked each other. Thus, the indicator 36*b* is turned on by the display driver 35. After the playback of a karaoke song is launched, both of the singers A and B sing the main melody part in unison before the microphones 1*a* and 1*b*. Contrary to the first mode M1, the second vocal signal picked up by the microphone 1*b* is pitch-shifted by the harmonizer 25. The generated harmony signal is fed to the mixer 27. Also in this second mode, the switch SW3 is made open so that the original voice is never inputted to the mixer 27. Only the generated harmony signal goes into the mixer 27 and then into the mixer 28. The first vocal signal picked up by the microphone 1*l* is fed to the mixer 28 as it is as the main melody. Thus, the mixer 28 mixes the harmony signal generated in harmonizing with the main melody sung by the singer B with the first vocal signal corresponding to the main melody sung by the singer A. As in the mode M1, the output of the mixer 28 is added with the echo components generated by the echo effector 31, and is then mixed with the musical signal in the mixer 32. The final signal is reproduced through the power amplifier 34 and the speaker SP. Thus, contrary to the mode M1, the voice of the singer A is reproduced as it is as the main melody, while the voice of the singer B is converted into the chorus sound harmonizing with the main melody in the mode M2. Even if the singers A and B sing the main melody in unison without any consideration for harmony, it is possible to perform a chorus in which the singer A sings the main part and the singer B sings the harmony part.

(3) Mode M3

The operation in the third mode M3 will be explained hereunder. If the user selects the mode M3 through the key controller, all the switches SW1 to SW4 are switched to the respective contacts "c" with being interlocked each other. Thus, the indicator 36*c* is turned on by the display driver 35. After the playback of a requested karaoke song is launched, both of the singers A and B sing the main melody part in unison before the respective microphones 1*a* and 1*b*. The first and second vocal signals picked up by the microphones 1*a* and 1*b* are mixed with each other by the mixer 24, and are then pitch-shifted by the harmonizer 25. The generated harmony signal is fed to the mixer 27. The switch SW3 is closed so that the original first and second vocal signals are mixed with the generated harmony signal and then go into the mixer 28. The original first and second vocal signals are never inputted into the mixer 28 through the switches SW1 and SW2 so that the output of the mixer 27 is passed to the echo effector 31 as it is and is added with the echo components there. Finally, the mixer 32 mixes the vocal signals and the harmony signal with the musical signal to acoustically reproduce the mixed ones of the first and second live singing sounds, the harmony chorus sound and the orchestral accompaniment sound by the power amplifier 34 and the speaker SP. Thus, in the third mode M3, the harmony chorus sound is generated based on the mixture of the voices of the singers A and B, so that it is possible to present a chorus with two lead vocal singers.

In the disclosed embodiment, the echo generator 252 in FIG. 2 is comprised of the four pitch converters 61 to 64. However, the number of the pitch converters is not limited to that. Any number of supplemental pitch converters can be added in order to support more voices in the chorus.

The present invention can be applied to a network karaoke system. In the network karaoke system, the musical signal is generated by a sound source device in response to the MIDI (Musical Instrument Digital Interface) data distributed by a host computer through the network. The parameters to control the pitch shift of the pitch converters 61 to 64 can be distributed from the host computer as a part of the MIDI data.

In the embodiment described above, the sound reproduction system is structured as a monaural system with the single speaker SP. Of course, the sound reproduction system can be implemented as a stereo system with two or more speakers, since most of the recent musical sources are stereophonic.

Figure 3:
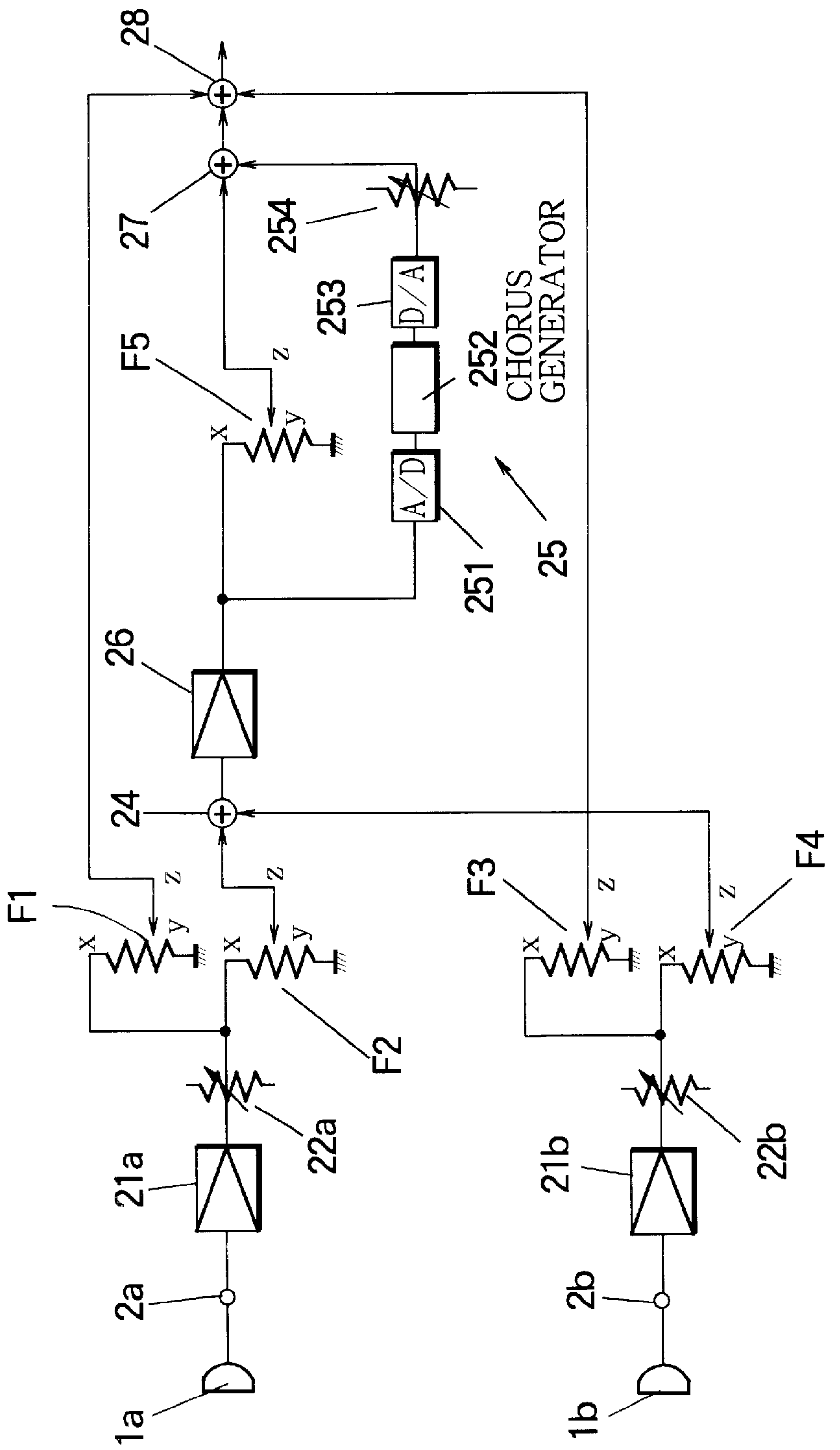
FIG. 3 is a schematic block diagram showing another embodiment of the karaoke apparatus according to the present invention, wherein fader potentiometers are used as a mode controller.

In the embodiment described above, the three operating modes M1, M2 and M3 are selected by the mode selector 23 and switches SW1 to SW4. However, these switches can be replaced by fader volumes or potentiometers F1 to F5 as illustrated in FIG. 3. In FIG. 3, two faders F1 and F2 are inserted in parallel to each other instead of the switch SW1, faders F3 and F4 are inserted in parallel to each other instead of the switch SW2, and fader F5 replaces the switch SW3. The fader becomes full conductive (turned on) if the slider z is at a position x, and becomes nonconductive (turned off) at a position y. The slider z may take intermediate points between the extreme positions x and y. In order to select the mode M1, the sliders z of the faders F1, F2, F3, F4 and F5 are respectively positioned at y, x, x, y, and y. The mode M2 can be selected by positioning the sliders z of the faders F1, F2, F3, F4 and F5 respectively at x, y, y, x, and y. Further, the mode M3 can be selected by positioning the sliders z of the faders F1, F2, F3, F4 and F5 respectively at y, x, y, x, and x.

In the arrangement shown in FIG. 3, it is possible to select not only the extreme modes M1 to M3, but also intermediate states of these modes. For example in the fader setting for the mode M2, the slider z of the fader F2 may be displaced from y to an intermediate position between x and y so that the first vocal signal of the singer A collected by the microphone la is mixed with the harmony signal generated based on the first vocal signal. The mixing ratio of the original voice and the synthesized chorus can be varied continuously by positioning of the slider z. Further, the operation modes can be changed continuously with cross-fading the first and second vocal signals. The position of the sliders z of the faders F1 to F5 can be controlled individually or in interlocking manner by manual operation. Otherwise, each slider z can be adjusted automatically by a certain electronic control device. By integrating such an electronic control device into an IC, the versatility of the circuit can be significantly improved.

For summary, the inventive karaoke apparatus mixes the live singing sound with the harmony chorus sound and the orchestral accompaniment sound. The first input terminal 2*a* is connectable to the microphone 1*a* to receive therefrom the first vocal signal representative of the first live singing sound. The second input terminal 2*b* is connectable to the microphone 1*b* to receive therefrom the second vocal signal representative of the second live singing sound which is different than the first live singing sound. The chorus generator 252 processes one of the first vocal signal and the second vocal signal to generate the harmony signal representative of the harmony chorus sound which originates from the one of the first live singing sound and the second live singing sound. The mixer 28 mixes the generated harmony signal with the other of the first vocal signal and the second vocal signal, which is not processed by the chorus generator, to provide a mix signal. The output device is comprised of the power amplifier 34 and the loudspeaker SP for amplifying the mix signal to acoustically produce the harmony chorus sound originating from the one of the first live singing sound and the second live singing sound concurrently with the other of the first live singing sound and the second live singing sound along with the orchestral accompaniment sound. The inventive karaoke apparatus further includes the selector 23 switchable between the first mode M1 where the first vocal signal is selected to be processed by the chorus generator 252 while the second vocal signal is passed to the mixer 28, and the second mode M2 where the second vocal signal is selected to be processed by the chorus generator 252 while the first vocal signal is passed to the mixer 28. Further, the selector 23 is switchable to the third mode M3 where both of the first vocal signal and the second vocal signal are selected to be processed by the chorus generator 252 so that the harmony chorus sound originating from both of the first live singing sound and the second live singing sound is mixed to both of the first live singing sound and the second live singing sound by the mixer 27. The chorus generator 252 includes the pitch converter 61 which processes the one of the first vocal signal and the second vocal signal by shifting a pitch thereof so as to create the harmony chorus sound which is made consonant with the one of the first live singing sound and the second live singing sound. Further, the chorus generator 252 has a plurality of the pitch converters 61–64 which respectively shift the one of the first vocal signal and the second vocal signal by different pitches so as to create a plurality of parts of the harmony chorus sound. The inventive karaoke apparatus further comprises the faders F1–F5 interposed between the output device and either of the first input terminal 2*a* and the second input terminal 2*b* for variably adjusting a mixing ratio of the harmony chorus sound and either of the first live singing sound and the second live singing sound. Further, the faders F1–F5 are interposed between the output device and either of the first input terminal 2*a* and the second input terminal 2*b* for cross-fading the first live singing sound and the second live singing sound with each other when the selector 23 is switched between the first mode M1 and the second mode M2.

As described in the foregoing, according to the invention, if different singers sing respectively before first and second microphones, the voice picked up through the first microphone is outputted as it is as the main melody, while the other voice picked up through the second microphone is converted into the harmony signal harmonizing with the main melody. Thus, even if the singers sing the main melody in unison without any consideration for harmony, it is possible to perform a chorus in which the first singer sings the main part and the second singer sings the harmony part. The singers can enjoy the pleasant harmony, which could not be derived in the conventional karaoke apparatus. Further, the roles of the main part and the chorus part before the first and second microphones can be exchanged with each other. Moreover, according to the invention, three operating modes can be selected. In the first mode, the voice picked up through the second microphone is outputted as it is, while the voice picked up through the first microphone is converted into the harmony signal harmonizing with the main melody. In the second mode, the voice picked up through the first microphone is outputted as it is, while the voice picked up through the second microphone is converted into the harmony signal harmonizing with the main melody. In the third mode, the voices picked up through the first and second microphones are converted into the harmony signal harmonizing with the main melody.

What is claimed is:

1. A karaoke apparatus for mixing a live singing sound with a harmony chorus sound and an orchestral accompaniment sound, comprising:

a first input terminal connectable to a microphone to receive therefrom a first vocal signal representative of a first live singing sound;

a second input terminal connectable to another microphone to receive therefrom a second vocal signal representative of a second live singing sound which is different than the first live singing sound;

a chorus generator for processing one of the first vocal signal and the second vocal signal to generate a harmony signal representative of the harmony chorus sound which originates from the one of the first live singing sound and the second live singing sound;

a mixer for mixing the generated harmony signal with the other of the first vocal signal and the second vocal signal, which is not processed by the chorus generator, to provide a mix signal; and an output device for amplifying the mix signal to a coustically produce the harmony chorus sound originating from the one of the first live singing sound and the second live singing sound concurrently with the other of the first live singing sound and the second live singing sound along with the orchestral accompaniment sound.

2. A karaoke apparatus according to claim 1, further comprising a selector switchable between a first state where the first vocal signal is selected to be processed by the chorus generator while the second vocal signal is passed to the mixer, and a second state where the second vocal signal is selected to be processed by the chorus generator while the first vocal signal is passed to the mixer.

3. A karaoke apparatus according to claim 2, wherein the selector is further switchable to a third state where both of the first vocal signal and the second vocal signal are selected to be processed by the chorus generator so that the harmony chorus sound originating from both of the first live singing sound and the second live singing sound is mixed to both of the first live singing sound and the second live singing sound.

4. A karaoke apparatus according to claim 1, wherein the chorus generator comprises a pitch converter which processes the one of the first vocal signal and the second vocal signal by shifting a pitch thereof so as to create the harmony chorus sound which is made consonant with the one of the first live singing sound and the second live singing sound.

5. A karaoke apparatus according to claim 4, wherein the chorus generator has a plurality of the pitch converters which respectively shift the one of the first vocal signal and the second vocal signal by different pitches so as to create a plurality of parts of the harmony chorus sound.

6. A karaoke apparatus according to claim 1, further comprising a fader interposed between the output device and either of the first input terminal and the second input terminal for variably adjusting a mixing ratio of the harmony chorus sound and either of the first live singing sound and the second live singing sound.

7. A karaoke apparatus according to claim 2, further comprising a fader interposed between the output device and either of the first input terminal and the second input terminal for cross-fading the first live singing sound and the second live singing sound with each other when the selector is switched between the first state and the second state.

* * * * *